US011279799B2

(12) United States Patent
Lee et al.

(10) Patent No.: US 11,279,799 B2
(45) Date of Patent: Mar. 22, 2022

(54) POLYESTER RESIN, PREPARATION METHOD THEREOF, AND RESIN MOLDED ARTICLE FORMED THEREFROM

(71) Applicant: SK CHEMICALS CO., LTD., Gyeonggi-do (KR)

(72) Inventors: Su-Min Lee, Seoul (KR); Yoo Jin Lee, Gyeonggi-do (KR); Kyu-Chan Han, Gyeonggi-do (KR)

(73) Assignee: SK Chemicals Co., Ltd., Gyeonggi-Do (KR)

( * ) Notice: Subject to any disclaimer, the term of this patent is extended or adjusted under 35 U.S.C. 154(b) by 830 days.

(21) Appl. No.: 16/065,368

(22) PCT Filed: Dec. 12, 2016

(86) PCT No.: PCT/KR2016/014541
§ 371 (c)(1),
(2) Date: Jun. 22, 2018

(87) PCT Pub. No.: WO2017/111370
PCT Pub. Date: Jun. 29, 2017

(65) Prior Publication Data
US 2021/0171706 A1 Jun. 10, 2021

(30) Foreign Application Priority Data
Dec. 24, 2015 (KR) .................. 10-2015-0186275

(51) Int. Cl.
C08G 63/18 (2006.01)
C08G 63/183 (2006.01)
C08G 63/16 (2006.01)
C08G 63/181 (2006.01)
C08G 63/199 (2006.01)

(52) U.S. Cl.
CPC ........... *C08G 63/183* (2013.01); *C08G 63/16* (2013.01); *C08G 63/18* (2013.01); *C08G 63/181* (2013.01); *C08G 63/199* (2013.01)

(58) Field of Classification Search
CPC ...... C08G 63/16; C08G 63/18; C08G 63/181; C08G 63/183; C08G 63/199
See application file for complete search history.

(56) References Cited

U.S. PATENT DOCUMENTS

| 5,959,066 | A | 9/1999 | Charbonneau et al. |
| 6,063,464 | A | 5/2000 | Charbonneau et al. |
| 6,063,465 | A | 5/2000 | Charbonneau et al. |
| 6,140,422 | A | 10/2000 | Khanarian et al. |
| 6,359,070 | B1 | 3/2002 | Khanarian et al. |
| 6,656,577 | B1 | 12/2003 | Adelman et al. |
| 2010/0160548 | A1* | 6/2010 | Noordover ............. C08G 63/82 524/601 |
| 2010/0178524 | A1* | 7/2010 | Yoshimura ............. B32B 27/08 428/480 |
| 2012/0282833 | A1 | 11/2012 | Lee et al. |
| 2016/0168321 | A1* | 6/2016 | Kulkarni .................. C08K 3/30 524/159 |
| 2018/0155493 | A1* | 6/2018 | Jacquel .................. C08G 63/78 |

FOREIGN PATENT DOCUMENTS

| CN | 1298343 | 6/2001 |
| CN | 1298416 | 6/2001 |
| CN | 1298426 | 6/2001 |
| CN | 1298461 | 6/2001 |
| CN | 1675282 | 9/2005 |
| CN | 102712210 | 10/2012 |
| EP | 2837581 | 2/2015 |
| JP | H10-512608 | 12/1998 |
| JP | 2006-070101 | 3/2006 |
| JP | 2006-070184 | 3/2006 |
| JP | 2006-089629 | 4/2006 |
| JP | 2009-001751 | 1/2009 |
| KR | 10-2006-0007447 | 1/2006 |
| KR | 10-2011-0036123 | 4/2011 |
| KR | 10-2011-0075486 | 7/2011 |
| KR | 10-2012-0036856 | 4/2012 |
| KR | 10-2012-0088209 | 8/2012 |
| KR | 10-2013-0136777 | 12/2013 |

OTHER PUBLICATIONS

International Search Report prepared by the Korean Intellectual Property Office dated Mar. 20, 2017, for International Application No. PCT/KR2016/014541.
Extended Search Report for European Patent Application No. EP 16879237.2, dated Jun. 25, 2019, 6 pages.

* cited by examiner

*Primary Examiner* — Robert S Jones, Jr.
(74) *Attorney, Agent, or Firm* — Sheridan Ross P.C.

(57) ABSTRACT

Provided are a polyester resin having high heat resistance and degree of crystallinity, a preparation method thereof, and a resin molded article formed therefrom, the resin molded article having superior heat resistance and mechanical strength and maintaining high transparency.

14 Claims, No Drawings

POLYESTER RESIN, PREPARATION METHOD THEREOF, AND RESIN MOLDED ARTICLE FORMED THEREFROM

CROSS REFERENCE TO RELATED APPLICATIONS

This application is a national stage application under 35 U.S.C. 371 and claims the benefit of PCT Application No. PCT/KR2016/014541 having an international filing date of 12 Dec. 2016, which designated the United States, which PCT application claimed the benefit of South Korea Application No. 10-2015-0186275 filed 24 Dec. 2015, the disclosure of each of which are incorporated herein by reference.

TECHNICAL FIELD

The present disclosure relates to a polyester resin having high heat resistance and high degree of crystallinity, a preparation method thereof, and a resin molded article formed therefrom, the resin molded article having superior heat resistance and mechanical strength and maintaining high transparency.

BACKGROUND

Although polyethylene terephthalate (PET) which is a representative polyester resin has many characteristics suitable for use in bottles, etc., its use in hot fill jars, etc. which are required to have heat resistance has been restricted due to its glass transition temperature of 80° C.

To overcome this problem, technologies of increasing the glass transition temperature of PET by copolymerization with many different monomers have been developed. Of the monomers, isosorbide has attracted attention as a comonomer applicable to PET, because isosorbide has advantages that it is a raw material derived from plant, increases the glass transition temperature, and improves mechanical strength after solid phase polymerization.

However, as a content of isosorbide is increased to improve heat resistance, regularity of polymer chains is decreased, leading to a decrease of crystallization rate. A low crystallization rate generates fusion during a crystallization process and increases an amount of agglomerates produced by fusion of two or more chips, and therefore, it is impossible to produce a final product or quality of the final product is deteriorated. Further, the addition amount of isosorbide exceeds a particular level, the formed resin does not function as a crystalline resin, and therefore, there is a limit in the improvement of heat resistance while enabling crystallization and solid phase polymerization.

TECHNICAL PROBLEM

The present disclosure provides a polyester resin having superior heat resistance and degree of crystallinity, and a preparation method thereof.

Further, the present disclosure provides a resin molded article formed from the polyester resin, the resin molded article having superior heat resistance, mechanical strength, and transparency.

TECHNICAL SOLUTION

In order to achieve the above objects, an aspect of the present disclosure provides a polyester resin has a structure, in which acid moieties derived from a dicarboxylic acid or a derivative thereof and diol moieties derived from diol are repeated by polymerization of the dicarboxylic acid or the derivative thereof including a terephthalic acid or a derivative thereof and the diol including isosorbide, the polyester resin including 7 to 20 mol % of the diol moieties derived from isosorbide with respect to the total diol moieties derived from diol, and having an intrinsic viscosity of 0.85 dl/g or more, which is measured at 35° C. after dissolving the polyester resin in ortho chloro phenol at a concentration of 1.2 g/dl at 150° C. for 15 minutes, a glass transition temperature of 87° C. or higher, and enthalpy of fusion of 40 J/g or more, which is measured during $1^{st}$ scan by differential scanning calorimetry (DSC).

EFFECT OF THE INVENTION

A polyester resin according to an embodiment of the present disclosure has high degree of crystallinity, and also enables providing a resin molded article having superior heat resistance and mechanical strength and maintaining high transparency. The resin molded article is able to maintain superior physical properties due to crystals which are crystallized under shear stress and included in the polyester resin, and therefore, it may be suitable for use in hot fill jars, high-pressure containers, etc.

DETAILED DESCRIPTION OF THE EMBODIMENTS

Hereinafter, a polyester resin, a preparation method thereof, and a resin molded article formed therefrom according to specific embodiments of the present disclosure will be described.

Unless otherwise stated, the terminology used herein is for the purpose of describing exemplary embodiments only and is not intended to limit the present invention. The singular forms used herein may be intended to include the plural forms as well, unless the context clearly indicates otherwise. It will be understood that the term 'include', when used herein, specifies stated features, regions, integers, steps, operations, elements, and/or components, but do not preclude the presence or addition of other features, regions, integers, steps, operations, elements, components, and/or groups thereof.

According to an embodiment of the present disclosure, provided is a polyester resin has a structure, in which acid moieties derived from a dicarboxylic acid or a derivative thereof and diol moieties derived from diol are repeated by polymerization of the dicarboxylic acid or the derivative thereof including a terephthalic acid or a derivative thereof and the diol including isosorbide, the polyester resin including 7 to 20 mol % of the diol moieties derived from isosorbide with respect to the total diol moieties derived from diol, and having an intrinsic viscosity of 0.85 dl/g or more, which is measured at 35° C. after dissolving the polyester resin in ortho chloro phenol at a concentration of 1.2 g/dl at 150° C. for 15 minutes, a glass transition temperature of 87° C. or higher, and enthalpy of fusion of 40 J/g or more, which is measured during $1^{st}$ scan by differential scanning calorimetry (DSC).

PET, a representative polyester resin, may easily exhibit high degree of crystallinity due to high regularity of polymer chains, thereby satisfying ΔHf of the above range. However, PET has a low heat deflection temperature (HDT), and thus there is a restriction in its use in hot fill bottles, etc. which are required to have high heat resistance.

In order to solve this problem, a method of introducing isosorbide into polymer main chains has been suggested. However, moieties derived from isosorbide decreases regularity of polymer chains to decrease crystallization rate of a resin. As a result, the low crystallization rate generates fusion during a crystallization process of the resin. The crystallization process is an essential step for solid phase polymerization. Therefore, it is difficult to perform the solid phase polymerization of resins that are hard to crystallize, and it is impossible to improve mechanical strength by further increasing intrinsic viscosity. Due to these problems, there is a limit in the content of isosorbide which may be introduced into polymer main chains.

On the contrary, when the addition amount of isosorbide is as insufficient as less than 7 mol %, a heat deflection temperature becomes lower than 75° C., and thus sufficient heat resistance may not be achieved. In general, to use the resin in hot fill jars, etc., higher HDT is more favorable, and HDT of at least 75° C. or higher is required. Accordingly, when the content of isosorbide is low, it is impossible to achieve a desired level of heat resistance. To solve this problem, an additional heat treatment process may be performed after injection molding, thereby improving heat resistance and mechanical strength. However, in this case, crystals produced by heat cause haze formation in injection-molded articles, and in particular, when a haze value is 1% or more, the haze is generally observed with the naked eyes, and there is a restriction in its use in food containers or bottles.

Despite these technical limitations, the polyester resin according to an embodiment has intrinsic viscosity, glass transition temperature, and enthalpy of fusion within the above ranges to exhibit high degree of crystallinity while exhibiting superior heat resistance and mechanical strength.

In particular, the polyester resin includes a sufficient amount of isosorbide to have higher glass transition temperature than PET, and therefore, the resin has high heat resistance and its crystallization and solid phase polymerization are possible, thereby improving intrinsic viscosity, sufficiently. For this reason, the polyester resin has increased mechanical strength which is represented by tensile strength, thereby being applied to high-pressure spray containers, etc. which are required to have high strength and heat resistance at the same time. For example, tensile strength at yield point reaches 60 Mpa or more, and tensile strength at break point reaches 50 Mpa or more, and therefore, the polyester resin endures a high pressure of about 20 bar during a burst pressure test. Accordingly, it is possible to apply the polyester resin to high-pressure spray containers.

To provide the polyester resin according to an embodiment, a monomer mixture for synthesis of the polyester resin may be melt-polymerized while controlling the addition amount of isosorbide so that the produced resin has a sufficient glass transition temperature and crystallization occurs without fusion between pellets. The polymer thus obtained is subjected to solid phase polymerization while intrinsic viscosity of the polymer before and after solid phase polymerization is controlled within a particular range. In detail, a polymer having a relatively low intrinsic viscosity is obtained by polymerizing the monomer mixture, and the polymer is subjected to solid phase polymerization until it has a relatively high intrinsic viscosity, so that the degree of crystallinity becomes sufficiently high. Further, the solid phase polymerization time is increased to 30 hrs or longer to allow sufficient formation of crystals at a high temperature, thereby increasing the degree of crystallinity, which may be confirmed by $\Delta Hf$. Through this process, a large number of crystals may be uniformly generated from regular polymer chains having a low molecular weight. These crystals are small in size, and remain in the product as crystals even after injection, while maintaining transparency, thereby improving mechanical strength such as tensile strength at yield point and at break point, etc., and affecting improvement of heat resistance such as an increase in heat deflection temperature at the same time.

As a larger number of uniform crystals are generated in the polyester resin, a larger amount of calorie is needed to melt the crystals. Thus, high enthalpy of fusion was observed when measured during $1^{st}$ scan by differential scanning calorimetry (DSC).

In detail, the polyester resin according to an embodiment has enthalpy of fusion ($\Delta Hf$) of 40 J/g or more, which is measured during $1^{st}$ scan by differential scanning calorimetry (DSC), indicating high degree of crystallinity. The $\Delta Hf$ value may be 45 J/g or more, 50 J/g or more, 52 J/g or more, or 55 J/g or more, and an upper limit of $\Delta Hf$ is, but not particularly limited to, for example, 100 J/g or less, or 70 J/g or less.

In particular, the polyester resin has physical properties that an intrinsic viscosity is 0.85 dl/g or more as measured at 35° C. after dissolving the polyester resin in ortho chloro phenol at a concentration of 1.2 g/dl at 150° C. for 15 minutes, and a glass transition temperature is 87° C. or higher, and satisfies $\Delta Hf$ within the above-described range. Upper limits of the glass transition temperature and the intrinsic viscosity of the polyester resin according to an embodiment are not particularly limited, but the glass transition temperature may be controlled to 120° C. or less, and the intrinsic viscosity may be controlled to 1.40 dl/g or less. The polyester resin may exhibit satisfactory physical properties within the above ranges. Further, the polyester resin may exhibit a sufficient draw ratio to easily achieve desired mechanical properties, and its molding is easy, thereby being used in a wide variety of applications.

Hereinafter, a preparation method of the polyester resin will be described in detail.

The polyester resin may be prepared by (a) carrying out an esterification reaction or an ester exchange reaction of (i) a dicarboxylic acid or a derivative thereof including a terephthalic acid or a derivative thereof and (ii) diol including 7 mol % of isosorbide with respect to the total diol; (b) carrying out a polycondensation reaction of a product resulting from the esterification reaction or ester exchange reaction until intrinsic viscosity as measured at 35° C. after dissolving the product in ortho chloro phenol at a concentration of 1.2 g/dl at 150° C. for 15 minutes reaches 0.40 dl/g to 0.60 dl/g; (c) crystallizing a polymer prepared by the polycondensation reaction; and (d) carrying out solid phase polymerization of the crystallized polymer until intrinsic viscosity as measured at 35° C. after dissolving the polymer in ortho chloro phenol at a concentration of 1.2 g/dl at 150° C. for 15 minutes reaches 0.85 dl/g or more. Here, the preparation method of the polyester resin may be carried out in a batch, semi-continuous, or continuous manner. The esterification and polycondensation reactions are preferably carried out under an inert gas atmosphere, and the mixing of the polyester resin and other additives may be simple mixing or mixing via extrusion.

As described above, while using a sufficient amount of isosorbide, reaction conditions are controlled so that a difference between intrinsic viscosity of the polyester resin after the (b) polycondensation reaction and intrinsic viscosity of the polyester resin after the (d) solid phase polymerization is large, and the polyester resin after the (d) solid phase polymerization has higher intrinsic viscosity, thereby providing the polyester resin satisfying all of glass transition temperature, intrinsic viscosity and ΔHf within the above-described range.

As used herein, the term 'dicarboxylic acid or derivative thereof' means one or more compounds selected from dicarboxylic acid and dicarboxylic acid derivatives. The term dicarboxylic acid derivatives' mean alkyl esters of dicarboxylic acid (including C1-C4 lower alkyl esters such as monomethyl, monoethyl, dimethyl, diethyl, or dibutyl esters), or anhydrides of dicarboxylic acid. Therefore, the terephthalic acid or the derivative thereof collectively refers to terephthalic acid; monoalkyl or dialkylterephthalate; and compounds reacting with diol to form terephthaloyl moieties, such as terephthalic acid anhydride.

As the (i) dicarboxylic acid or derivative thereof, terephthalic acid or a derivative thereof is mainly used. Specifically, as the (i) dicarboxylic acid or derivative thereof, the terephthalic acid or the derivative thereof may be used alone. Further, the (i) dicarboxylic acid or derivative thereof may be a mixture of the terephthalic acid or the derivative thereof and one or more selected from the group consisting of C8 to C14 aromatic dicarboxylic acid or a derivative thereof and C4 to C12 aliphatic dicarboxylic acid or a derivative thereof as other dicarboxylic acid or derivative thereof than the terephthalic acid or the derivative thereof. The C8 to C14 aromatic dicarboxylic acid or the derivative thereof may include aromatic dicarboxylic acids or derivatives thereof commonly used in the preparation of the polyester resin, for example, isophthalic acid, dimethyl isophthalate, phthalic acid, dimethyl phthalate, phthalic anhydride, naphthalene dicarboxylic acid such as 2,6-naphthalene dicarboxylic acid, etc., dialkylnaphthalene dicarboxylate such as dimethyl 2,6-naphthalene dicarboxylate, etc., diphenyl dicarboxylic acid, etc. The C4 to C12 aliphatic dicarboxylic acid or the derivative thereof may include linear, branched, or cyclic aliphatic dicarboxylic acids commonly used in the preparation of the polyester resin, for example, cyclohexane dicarboxylic acids such as 1,4-cyclohexane dicarboxylic acid, 1,3-cyclohexane dicarboxylic acid, etc., cyclohexane dicarboxylate such as dimethyl 1,4-cyclohexane dicarboxylate, dimethyl 1,3-cyclohexane dicarboxylate, etc., and sebacic acid, succinic acid, isodecylsuccinic acid, maleic acid, maleic acid anhydride, fumaric acid, adipic acid, glutaric acid, azelaic acid, etc.

The (i) dicarboxylic acid or derivative thereof may include 50 mol % or more, 60 mol % or more, 70 mol % or more, 80 mol % or more, or 90 mol % or more of the terephthalic acid or the derivative thereof with respect to the total (i) dicarboxylic acid or derivative thereof. Further, the (i) dicarboxylic acid or derivative thereof may include 0 to 50 mol %, more than 0 mol % and 50 mol % or less, or 0.1 to 40 mol % of other dicarboxylic acid or derivative thereof than the terephthalic acid or the derivative thereof with respect to the total (i) dicarboxylic acid or derivative thereof. Within the above-described range, the polyester resin having appropriate physical properties may be prepared.

Meanwhile, the isosorbide may be used so that a content of the diol moieties derived from isosorbide is 7 to 20 mol % or 7 to 11 mol % with respect to the total diol moieties derived from diol of the polyester resin to be prepared. That is, the isosorbide may be used in an amount of 7 mol % or more with respect to the total diol. An upper limit of the isosorbide content may be 30 mol % or less or 25 mol % or less with respect to the total diol so that the content of the diol moieties derived from isosorbide is 20 mol % or less with respect to the total diol moieties derived from diol of the polyester resin to be prepared.

If the content of isosorbide exceeds the above range, yellowing may be severe, and crystallinity may be remarkably reduced, and therefore, solid phase polymerization is impossible. If the content of isosorbide is less than the above range, sufficient heat resistance and mechanical strength may not be achieved. However, a polyester resin having high degree of crystallinity while having sufficiently improved heat resistance and mechanical strength may be prepared by controlling the content of isosorbide within the above range.

As other diol than isosorbide, the (ii) diol may include compounds commonly used in the preparation of the polyester resin, for example, C8 to C40 or C8 to C33 aromatic diol, C2 to C 20 or C 2 to C 12 aliphatic diol, or a mixture thereof.

Specific examples of the aromatic diol may include ethylene oxides such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethyl ene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, and polyoxyethylene-(6)-2,2-bis(4-hydroxyphenyl)propane, and/or propylene oxide addition bisphenol A derivatives (polyoxyethylene-(n)-2,2-bis(4-hydroxyphenyl)propane, polyoxypropylene-(n)-2,2-bis(4-hydroxyphenyl)propane, or polyoxypropylene-(n)-polyoxyethylene-(n)-2,2-bis(4-hydroxyphenyl)propane). Here, means the number of the polyoxyethylene or polyoxypropylene units. Specific examples of the aliphatic diol may include linear, branched, or cyclic aliphatic diol components such as ethylene glycol, diethylene glycol, triethylene glycol, propanediols (e.g., 1,2-propanediol, 1,3-propanediol, etc.), 1,4-butanediol, pentanediols, hexanediols (e.g., 1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethylcyclobutanediol, etc. In the (ii) diol, the above-listed diols other than isosorbide may be included singly or in a mixture of two or more thereof. For example, ethylene glycol, 1,4-cyclohexanedimethanol, polyoxyethylene-(2.0)-2,2-bis(4-hydroxyphenyl)propane, etc. may be included singly or in a mixture of two or more thereof, in addition to the isosorbide. When the content of isosorbide is less than 7 mol % with respect to the total (ii) diol, there is concern about insufficient improvement in heat resistance of the polyester resin. When the content of isosorbide is more than 20 mol %, crystallinity is remarkably reduced after melt polymerization, and thus solid phase polymerization is impossible, and there is concern about yellowing of the polyester resin or a product formed therefrom. With regard to the (ii) diol, a main component of diol other than isosorbide is preferably ethylene glycol, and a content of diol used to improve physical properties, other than ethylene glycol, may be controlled in an amount of, for example, 0 to 50 mol % or 0.1 to 30 mol % with respect to the total (ii) diol.

To prepare the polyester resin according to an embodiment, the (i) dicarboxylic acid or the derivative thereof and the (ii) diol may be injected into a reactor so that a molar ratio of the (ii) diol to (i) the dicarboxylic acid or the derivative thereof is 1.05 or more. Further, the (ii) diol may be injected into the reactor at a time before the polymerization reaction or several times during the polymerization reaction, if necessary.

In the (a) esterification reaction or ester exchange reaction, a catalyst may be used. This catalyst may be exemplified by a methylate of sodium or magnesium; an acetate, a borate, a fatty acid salt, a carbonate, an alkoxy salt of Zn, Cd, Mn, Co, Ca, Ba, Ti, etc.; a metal Mg; an oxide of Pb, Zn, Sb, Ge, etc.

The (a) esterification reaction or ester exchange reaction may be carried out in a batch, semi-continuous, or continuous manner. The respective raw materials may be separately injected, but they are preferably injected in the form of a slurry which is obtained by mixing the dicarboxylic acid or the derivative thereof with the diol.

A polycondensation catalyst, a stabilizer, an orthochromatic agent, a crystallizing agent, an antioxidant, a branching agent, etc. may be added to the slurry before the starting of the (a) esterification reaction or ester exchange reaction, or to a product after the completion of the reaction. However, the injection timing of the above-described additives is not limited thereto, and the additives may be injected at any time point during the preparation of the polyester resin. As the polycondensation catalyst, one or more selected from common titanium-, germanium-, antimony-, aluminum-, and tin-based compounds may be appropriately used. Examples of the useful titanium-based compound may include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, a titanium dioxide/silicon dioxide copolymer, a titanium dioxide/zirconium dioxide copolymer, etc. Examples of the useful germanium-based catalyst include germanium dioxide, copolymers using the same, etc. As the stabilizer, common phosphorus-based compounds such as phosphoric acid, trimethyl phosphate, triethyl phosphate, etc. may be used, and an addition amount thereof is 10 ppm to 200 ppm on the basis of phosphorus element relative to the weight of the resulting polymer (polyester resin). If the addition amount of the stabilizer is less than 10 ppm, the stabilization effect will be insufficient and may cause yellowing of the polymer. If the addition amount of the stabilizer is more than 200 ppm, a polymer having a desired high degree of polymerization may not be obtained. The orthochromatic agent added to improve a color of the polymer may be exemplified by common orthochromatic agents such as cobalt acetate, cobalt propionate, etc., and an addition amount thereof is 10 ppm to 200 ppm on the basis of cobalt element relative to the weight of the resulting polymer (polyester resin). If necessary, as the organic orthochromatic agent, an anthraquionone-based compound, a perinone-based compound, an azo-based compound, a methane-based compound, etc. may be used, and an addition amount thereof may be controlled from 0 ppm to 50 ppm relative to the weight of the resulting polymer (polyester resin). If the content of the orthochromatic agent exceeds the above range, yellowing of the polyester resin may not be sufficiently prevented or physical properties thereof may be deteriorated. The crystallizing agent may be exemplified by a nucleating agent, a UV absorber, a polyolefin-based resin, a polyamide resin, etc. The antioxidant may be exemplified by a hindered phenol-based antioxidant, a phosphite-based antioxidant, a thio-ether-based antioxidant, a mixture thereof, etc. The branching agent may be exemplified by common branching agents having three or more functional groups, such as trimellitic anhydride, trimethylol propane, trimellitic acid, a mixture thereof, etc. In addition, a toner such as Polysynthren Blue RLS manufactured by Clariant Corp., Solvaperm Red BB manufactured by Clariant Corp., etc. may be used.

The (a) esterification reaction or ester exchange reaction may be carried out at a temperature of 150° C. to 300° C. or 200° C. to 270° C. and a pressure of 0 kgf/cm$^2$ to 10.0 kgf/cm$^2$, 0 kgf/cm$^2$ to 5.0 kgf/cm$^2$ or 0.1 kgf/cm$^2$ to 3.0 kgf/cm$^2$. If the reaction temperature and pressure exceed the above range, physical properties of the polyester resin may be deteriorated. The reaction time (average retention time) may be commonly 1 hr to 24 hrs or 2 hrs to 8 hrs, and may varying depending on the reaction temperature, pressure, a molar ratio of diol to the dicarboxylic acid or the derivative thereof to be used.

The product resulting from the esterification or ester exchange reaction may be prepared as a polyester resin having a higher degree of polymerization via a polycondensation reaction. In general, the polycondensation reaction may be carried out at a temperature of 150° C. to 300° C., 200° C. to 290° C. or 250° C. to 290° C. and a reduced pressure of 0.01 mmHg to 400 mmHg, 0.05 mmHg to 100 mmHg, or 0.1 mmHg to 10 mmHg. The reduced pressure of 0.01 mmHg to 400 mmHg is for removing glycol which is a by-product of the polycondensation reaction. Therefore, if the reduced pressure exceeds the above range, removal of the by-product may be insufficient. Further, if the polycondensation reaction temperature exceeds the above range, physical properties of the polyester resin may be deteriorated. The polycondensation reaction may be carried out for a time taken for the polyester resin to have a desired intrinsic viscosity, for example, for an average retention time of 1 hr to 24 hrs.

As described above, the (d) solid polymerization may be carried out so that the polymer having a low intrinsic viscosity obtained by the polycondensation reaction has a higher intrinsic viscosity, thereby providing the polyester resin satisfying all of glass transition temperature, intrinsic viscosity and ΔHf within the above-described ranges. In particular, the present inventors found that a large amount of more uniform crystals may be generated by solid phase polymerization of relatively short polymer chains, and owing to these crystals, the polyester resin having a high degree of crystallinity without reduction in transparency may be provided.

Therefore, the intrinsic viscosity of the polymer produced by the polycondensation reaction may be controlled from 0.40 dl/g to 0.60 dl/g. If the intrinsic viscosity is less than 0.40 dl/g, a reaction rate of the solid phase reaction may be remarkably reduced. If the intrinsic viscosity is more than 0.60 dl/g, it is difficult to provide the polyester resin having a high degree of crystallinity, even after the (d) solid phase polymerization, and viscosity of a melt may increase during melt polymerization, and therefore, discoloration of the polymer may be increased by shear stress between a stirrer and a reactor, and side reaction materials such as acetaldehyde may be increased. Further, a crystallization rate may be remarkably reduced, and therefore, fusion may occur during crystallization, and deformation of a pellet shape may easily occur during crystallization.

In the (c) crystallization, the polymer obtained by the (b) polycondensation reaction is extruded from the reactor, and then prepared as particles. A method of preparing the particles may be a strand cutting method of extruding the polymer in a strand shape, solidifying the strand-shaped polymer in a cooling solution, and then cutting the polymer by a cutter, or an underwater cutting method of immersing die holes in a cooling solution, directly extruding the polymer in the cooling solution, and then cutting the polymer by a cutter. In the general strand cutting method, there is no problem with cutting when strands are well solidified by maintaining the cooling solution at a low temperature. In the underwater cutting method, it is preferable that the shape of the polymer becomes uniform by maintaining the temperature of the cooling solution according to the polymer. However, in the case of a crystalline polymer, the cooling solution may be maintained at a high temperature in order to induce crystallization during extrusion.

Meanwhile, it is also possible to wash the polymer particles with water. Upon washing with water, a temperature of water is preferably the same as or about 5° C. to 20° C. lower than the glass transition temperature of the polymer. Fusion may undesirably occur at a temperature higher than the above temperature. In the case of the polymer particles of which crystallization is induced during extrusion, fusion does not occur at a temperature higher than the glass transition temperature, and therefore, the temperature of water may be determined according to the degree of crystallization. It is possible to remove unreacted raw materials dissolved in water by washing the polymer particles with water. As the particle has a smaller size, the surface area relative to the weight of the particle is increased. Therefore, it is more advantageous that the particle has a smaller size. To achieve this purpose, the particle may be prepared as a particle having an average weight of about 14 mg or less.

The polymer particles are subjected to crystallization in order to prevent fusion during solid phase reaction. The crystallization may be carried out under air, inert gas, water vapor, water vapor-containing inert gas atmosphere or in a solution at 110° C. to 180° C. or 120° C. to 180° C. If the temperature is low, a rate at which crystals of the particles are generated is too slow. If the temperature is high, a rate at which the surface of the particles is melt is faster than the rate at which the crystals are generated, leading to generation of fusion between particles. As the particles are crystallized, heat resistance of the particles increases. Therefore, the crystallization may be divided into several stages, and carried out by increasing a temperature at each stage.

The solid phase reaction may be carried out under inert gas atmosphere such as nitrogen, carbon dioxide, argon, etc., or under reduced pressure of 400 mmHg to 0.01 mmHg and a temperature of 180° C. to 220° C. for an average retention time of 1 hr or longer, preferably 30 hrs or longer. A molecular weight is further increased by this solid phase reaction, and residual raw materials unreacted in a melting reaction and circular oligomers, acetaldehyde produced during the reaction, etc. may be removed.

In particular, to provide the polyester resin of an embodiment, the solid phase polymerization may be performed until the intrinsic viscosity reaches 0.85 dl/g or more. As such, when the polymer having a low intrinsic viscosity is subjected to the solid phase polymerization until it has high intrinsic viscosity, a large amount of crystals are produced by shear induced crystallization, and the resulting crystals are small to improve heat resistance and degree of crystallinity without reduction in transparency. Further, the polyester resin provided by this method are advantageous in that it exhibits high transparency while including a large amount of crystals crystallized under shear stress after processing, compared to the existing polyester resins. If the intrinsic viscosity is less than the above-described range, it is difficult to provide the polyester resin having superior heat resistance and high degree of crystallinity.

The polyester resin prepared by the above-described method has a structure, in which the acid moieties derived from the dicarboxylic acid or the derivative thereof and the diol moieties derived from diol are repeated. In the present disclosure, the acid moiety or the diol moiety refers to a residue that remains after removing hydrogen, a hydroxy group, or an alkoxy group therefrom by polymerization of the dicarboxylic acid or the derivative thereof and the diol.

In the above-described method, isosorbide is used within a particular range, thereby providing the polyester resin, in which the amount of the diol moieties derived from isosorbide is 7 to 20 mol % with respect to the total diol moieties derived from diol. As described above, the polyester resin may have superior heat resistance and mechanical strength and high degree of crystallinity by controlling the content of the diol moieties derived from isosorbide within the above-described range. To further improve these characteristics, the content of the diol moieties derived from isosorbide in the polyester resin may be controlled from 7 mol % to 11 mol % with respect to the total diol moieties.

Generally, the polyester resin has a structure, in which acid moieties derived from the dicarboxylic acid or the derivative thereof and diol moieties derived from diol are repeated, but it may also include a structure formed by linkage between diol moieties derived from diol due to side reaction of diol and another diol. However, according to the above-described method, this side reaction may be remarkably reduced. For example, moieties derived from diethylene glycol may be included in an amount of about 6 mol % or less or about 4 mol % or less with respect to the total moieties derived from diol in the polyester resin. The polyester resin may exhibit sufficient glass transition temperature by including the moieties derived from diethylene glycol within the above range. The polyester resin may not include the moieties derived from diethylene glycol, and therefore, a lower limit of the content of the moieties derived from diethylene glycol is 0 mol %.

The polyester resin may have a number average molecular weight of about 15,000 g/mol to about 50,000 g/mol or about 20,000 g/mol to 40,000 g/mol. If the molecular weight is less than the above range, mechanical properties may be deteriorated and the polyester resin may not be sufficiently stretched when applied to bottles, sheets, stretched films, or fibers, and therefore, it is difficult to obtain desired mechanical properties. If the molecular weight is more than the above range, there is a problem that moldability may be reduced.

The polyester resin may have a crystallization temperature (Tc) of 120° C. to 190° C. or 130° C. to 180° C. Since the polyester resin has an appropriate crystallization rate within the above range, solid phase polymerization is possible, and the polyester resin may have high transparency after molding.

The polyester resin may have a melting point (Tm) of about 200° C. to about 250° C. or about 210° C. to about 245° C. Since the polyester resin has an appropriate degree of crystallization within the above range, it may have superior heat resistance and mechanical properties, and also be processed at an appropriate temperature to prevent yellowing.

The polyester resin may have a heat deflection temperature (HDT) of 75° C. or higher. The polyester resin to be used in hot fill jars requiring HDT of at least 75° C. or higher may be provided within the above range. More specifically, the polyester resin may exhibit the heat deflection temperature of 80° C. or higher. An upper limit of the heat deflection temperature is not particularly stable, and it may be about 120° C. or lower, or about 90° C. or lower.

The polyester resin may exhibit high transparency while having the above described properties. Specifically, when haze of a specimen having a thickness of 6 mm obtained from the polyester resin is measured in accordance with ASTM D1003-97, the haze may be less than 1%.

As described above, the polyester resin according to an embodiment exhibit high degree of crystallinity while exhibiting superior heat resistance and mechanical strength. Accordingly, the polyester resin may be applied to a variety of fields. In particular, the polyester resin has superior heat resistance, mechanical strength, and transparency, and is expected to be usefully applied to bottles, hot fill jars, high-pressure containers, sheets, stretched films, and fibers.

Meanwhile, according to another embodiment, provided is a resin molded article formed from the polyester resin. The resin molded article may be bottles, hot fill jars, high-pressure containers, sheets, stretched films, fibers, etc.

Hereinafter, actions and effects of the present invention will be described in more detail with reference to the specific Examples of the invention. However, these examples are merely illustrative of the present invention and the scope of the present invention is not to be determined thereby.

The following physical properties were measured according to the following methods.

(1) Intrinsic viscosity (IV): A specimen was dissolved in o-chlorophenol at a concentration of 1.2 g/dl at 150° C. for 15 minutes, and then intrinsic viscosity of the specimen was measured using a Ubbelohde type viscometer. In detail, the viscometer was maintained at a temperature of 35° C., and a time t (efflux time) and a time to which are taken for a solvent and for a solution to pass through a particular section inside the viscometer were determined, respectively. Thereafter, t and to values were substituted into Equation 1 to calculate a specific viscosity, and the specific viscosity thus calculated was substituted into Equation 2 to calculate an intrinsic viscosity.

$$\eta_{sp} = \frac{t - t_0}{t_0} \quad \text{[Equation 1]}$$

$$[\eta] = \frac{\sqrt{1 + 4A\eta_{sp}} - 1}{2Ac} \quad \text{[Equation 2]}$$

wherein A is the Huggins's constant of 0.247, and c is a concentration value of 1.2 g/dl.

(2) Glass transition temperature (Tg): Tg of the polyester resins prepared in Examples and Comparative Examples was measured by DSC (differential scanning calorimetry). A DSC 1 model manufactured by Mettler-Toledo Inc. was used as a measuring device. In detail, the polyester resin specimen to be used in analysis was dried using a dehumidify dryer (manufactured by Moretto, model: D2T) at 120° C. under nitrogen atmosphere for 5 hrs to 10 hrs. Thus, Tg was measured when a content of water remaining in the specimen was less than 500 ppm. About 6 mg to 10 mg of the dried specimen was taken and then an aluminum fan was filled therewith, and heated from room temperature to 280° C. at a rate of 10° C./min ($1^{st}$ scan), and annealed at 280° C. for 3 minutes. Thereafter, the specimen was rapidly cooled to room temperature, and then heated from room temperature to 280° C. at a rate of 10° C./min ($2^{nd}$ scan) to obtain a DSC curve. Tg value in DSC $2^{nd}$ scan was analyzed by glass transition function in the DSC menu of a related program (STARe software) provided by Mettler Toledo Inc. In this regard, Tg was determined as a temperature at which the steepest slope of the curve appeared at a first stepwise change of the DSC curve obtained in $2^{nd}$ scan during the heating process, and the temperature range of the scan was determined from −20° C. to 15° C. to 15° C. to 20° C. of a midpoint, calculated by the program.

(3) Enthalpy of fusion or heat of fusion (ΔHf): To examine degree of crystallinity of the polyester resins prepared in Examples and Comparative Examples, ΔHf was measured by DSC (differential scanning calorimetry). The DSC 1 model manufactured by Mettler-Toledo Inc. was used as a measuring device. In detail, the polyester resin specimen to be used in analysis was dried using a dehumidify dryer (manufactured by Moretto, model: D2T) at 120° C. under nitrogen atmosphere for 5 hrs to 10 hrs. Thus, ΔHf was measured when a content of water remaining in the specimen was less than 500 ppm. About 6 mg to 10 mg of the dried specimen was taken and maintained at 30° C. for 3 minutes, and then the temperature was raised from 30° C. to 280° C. at a rate of 10° C./min, and then maintained at 280° C. for 30 min ($1^{st}$ scan). ΔHf value for Tm peak (melting point) in DSC $1^{st}$ scan was analyzed by integration function in the TA menu of a related program (STARe software) provided by Mettler Toledo Inc. The temperature range of the $1^{st}$ scan was determined from onset point-10° C. to Tm peak+10° C., calculated by the program.

(4) Heat deflection temperature (HDT): An experimental specimen was prepared in accordance with ASTM D648, and heat deflection temperature was measured using a 6M-2 tester model manufactured by Toyoseiki Co., Ltd.

(5) Tensile strength: An experimental specimen was prepared in accordance with ASTM D638, and tensile strength was measured at a rate of 5 cm/min using a UTM universal tester, Z011 model manufactured by Zwick/Roell Inc.

(6) Haze: The polyester resins prepared in Examples and Comparative Examples were used to prepare specimens having a thickness of 6 mm, and haze thereof was measured in accordance with ASTM D1003-97 using a CM-3600A spectrophotometer manufactured by Minolta Inc.

Example 1: Preparation of Polyester Resin 3297 g of terephthalic acid (19.85 mol), 1269 g of ethylene glycol (20.4 mol), and 435 g of isosorbide (2.98 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.50 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C.

for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.91 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 58.5 J/g, Tg ($2^{nd}$ scan) was 89.5° C., HDT was 82.1° C., tensile strength at yield point was 65 MPa, tensile strength at break point was 54 MPa, and Haze was 0.66%.

Example 2: Preparation of Polyester Resin 3297 g of terephthalic acid (19.85 mol), 1672 g of ethylene glycol (26.9 mol), and 695 g of isosorbide (4.76 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm$^2$, and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.50 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.96 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 59.0 J/g, Tg ($2^{nd}$ scan) was 89.0° C., HDT was 82.3° C., tensile strength at yield point was 63 MPa, tensile strength at break point was 53 MPa, and Haze was 0.63%.

Example 3: Preparation of Polyester Resin 3297 g of terephthalic acid (19.85 mol), 1503 g of ethylene glycol (24.2 mol), and 522 g of isosorbide (3.57 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm$^2$, and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.52 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.98 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 57.7 J/g, Tg ($2^{nd}$ scan) was 90.5° C., HDT was 81.7° C., tensile strength at yield point was 63 MPa, tensile strength at break point was 53 MPa, and Haze was 0.65%.

Example 4: Preparation of Polyester Resin 173 kg of terephthalic acid (1041 mol), 78.9 kg of ethylene glycol (1271 mol), and 27.4 kg of isosorbide (187 mol) were injected, and 45.4 g of $GeO_2$ and 37.71 g of $Sb_2O_3$ as catalysts, 123 g of phosphoric acid as a stabilizer, and 17.8 g of cobalt acetate as an orthochromatic agent were used.

A temperature of a reactor was raised to 220° C. for 90 minutes under nitrogen atmosphere of 2 kgf/cm$^2$, and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.48 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.97 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 57.1 J/g, Tg ($2^{nd}$ scan) was 89.9° C., HDT was 82.0° C., tensile strength at yield point was 64 MPa, tensile strength at break point was 53 MPa, and Haze was 0.69%.

Example 5: Preparation of Polyester Resin 2910 g of terephthalic acid (17.52 mol), 1370 g of ethylene glycol (22.07 mol), and 448 g of isosorbide (3.07 mol) were injected, and 0.50 g of $GeO_2$ and 0.63 g of $Sb_2O_3$ as catalysts and 2.06 g of phosphoric acid as a stabilizer were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.50 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.96 dl/g.

The amount of the moieties derived from terephthalic acid was 100 mol % with respect to the total moieties derived from acid in the polyester resin thus prepared, and the amount of the moieties derived from isosorbide was 7 mol %, the amount of the moieties derived from ethylene glycol was 91 mol %, and the amount of the moieties derived from diethylene glycol was 2 mol %, with respect to the total moieties derived from diol.

Physical properties of the polyester resin were measured by the above-described methods, and as a result, it was confirmed that enthalpy of fusion in DSC $1^{st}$ scan was 58.7 J/g, Tg ($2^{nd}$ scan) was 87.3° C., HDT was 81.0° C., tensile strength at yield point was 63 MPa, tensile strength at break point was 52 MPa, and Haze was 0.77%.

Example 6: Preparation of Polyester Resin 3290 g of terephthalic acid (19.8 mol), 1487 g of ethylene glycol (24.0 mol), and 687 g of isosorbide (4.70 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.51 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.95 dl/g.

The amount of the moieties derived from terephthalic acid was 100 mol % with respect to the total moieties derived from acid in the polyester resin thus prepared, and the amount of the moieties derived from isosorbide was 10.9 mol %, the amount of the moieties derived from ethylene glycol was 87.1 mol %, and the amount of the moieties derived from diethylene glycol was 2 mol %, with respect to the total moieties derived from diol.

Physical properties of the polyester resin were measured by the above-described methods, and as a result, it was confirmed that enthalpy of fusion in DSC $1^{st}$ scan was 50.4 J/g, Tg ($2^{nd}$ scan) was 92.1° C., HDT was 84.3° C., tensile strength at yield point was 64 MPa, tensile strength at break point was 54 MPa, and Haze was 0.54%.

Example 7: Preparation of Polyester Resin 4000 g of dimethylterephthalate (20.6 mol), 1880 g of ethylene glycol (30.3 mol), and 550 g of isosorbide (3.76 mol) were injected, and 8 ppm (based on metal) of tetra-n-butoxy titanium and manganese (II) acetate tetrahydrate as catalysts, and 6 ppm of Polysyntheren Blue RBL from Clariant Corp. and 6 ppm of Sandplast Red G from Clariant Corp. as orthochromatic agents were injected, and then a temperature of a reactor was raised to 150° C. for 60 minutes while nitrogen was allowed to flow into the reactor. Then, nitrogen purging was stopped, and a reaction by-product, methanol was collected while the temperature of the reactor was raised to 250° C. for 2 hrs. The reaction was allowed to proceed until methanol generation was completed by a drop of the temperature of the reactor column.

Thereafter, 8 ppm of phosphoric acid as a stabilizer was injected, and then a pressure of the reactor was decreased from atmospheric pressure to 5 Torr (5 mmHg) for 30 minutes while the temperature of the reactor was raised from room temperature to 285° C. for 2 hrs. Then, the temperature and pressure of the reactor were maintained at 285° C. and 2 Torr (2 mmHg) to carry out a polycondensation reaction. The polycondensation reaction was carried out, until intrinsic viscosity (IV) of the mixture (melt) in the reactor became 0.51 dl/g.

The polyester resin obtained by the polycondensation reaction was prepared as particles, and the particles were left at 140° C. for 1 hr for crystallization. The crystals were injected to a solid phase polymerization reactor of 20 L volume. Thereafter, nitrogen was allowed to flow into the reactor at a rate of 20 L/kg*h. In this regard, the temperature of the reactor was raised from room temperature to 140° C. at a rate of 40° C./hr, and maintained at 140° C. for 3 hrs, and then the temperature was raised to 205° C. at a rate of 40° C./hrs and maintained. The solid phase polymerization reaction was carried out for 48 hrs, until intrinsic viscosity (IV) of the particles in the reactor became 0.96 dl/g.

The amount of the moieties derived from terephthalic acid was 100 mol % with respect to the total moieties derived from acid in the polyester resin thus prepared, and the amount of the moieties derived from isosorbide was 8 mol %, the amount of the moieties derived from ethylene glycol was 90 mol %, and the amount of the moieties derived from diethylene glycol was 2 mol %, with respect to the total moieties derived from diol.

Physical properties of the polyester resin were measured by the above-described methods, and as a result, it was confirmed that enthalpy of fusion in DSC $1^{st}$ scan was 55.4 J/g, Tg ($2^{nd}$ scan) was 89.0° C., HDT was 82.1° C., tensile strength at yield point was 62 MPa, tensile strength at break point was 53 MPa, and Haze was 0.69%.

Example 8: Preparation of Polyester Resin 3427 g of terephthalic acid (6.19 mol), 1590 g of ethylene glycol (25.6 mol), and 904 g of isosorbide (6.19 mol) were injected, and 0.91 g of $GeO_2$ and 0.75 g of $Sb_2O_3$ as catalysts, 2.50 g of phosphoric acid as a stabilizer, and 0.89 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.51 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.85 dl/g.

The amount of the moieties derived from terephthalic acid was 100 mol % with respect to the total moieties derived from acid in the polyester resin thus prepared, and the amount of the moieties derived from isosorbide was 11.5 mol %, the amount of the moieties derived from ethylene glycol was 84.7 mol %, and the amount of the moieties derived from diethylene glycol was 3.8 mol %, with respect to the total moieties derived from diol.

Physical properties of the polyester resin were measured by the above-described methods, and as a result, it was confirmed that enthalpy of fusion in DSC $1^{st}$ scan was 41.0 J/g, Tg ($2^{nd}$ scan) was 89.5° C., HDT was 82.3° C., tensile strength at yield point was 63 MPa, tensile strength at break point was 52 MPa, and Haze was 0.52%.

Comparative Example 1: Preparation of Polyester Resin 3297 g of terephthalic acid (19.85 mol), 1318 g of ethylene glycol (21.2 mol), and 377 g of isosorbide (2.58 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.65 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.91 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 38.0 J/g, Tg ($2^{nd}$ scan) was 89.1° C., HDT was 81.6° C., tensile strength at yield point was 57 MPa, tensile strength at break point was 47 MPa, and Haze was 0.64%.

Comparative Example 2: Preparation of Polyester Resin 3297 g of terephthalic acid (19.8 mol), 1318 g of ethylene glycol (21.2 mol), and 377 g of isosorbide (2.58 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.50 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.70 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 39.6 J/g, Tg ($2^{nd}$ scan) was 89.7° C., HDT was 81.8° C., tensile strength at yield point was 56 MPa, tensile strength at break point was 18 MPa, and Haze was 0.63%.

Comparative Example 3: Preparation of Polyester Resin 3297 g of terephthalic acid (19.85 mol), 1516 g of ethylene glycol (24.42 mol), and 348 g of isosorbide (2.38 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.60 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.97 dl/g.

The amount of the moieties derived from terephthalic acid was 100 mol % with respect to the total moieties derived from acid in the polyester resin thus prepared, and the amount of the moieties derived from isosorbide was 5 mol %, the amount of the moieties derived from ethylene glycol was 94 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 53.5 J/g, Tg ($2^{nd}$ scan) was 84.5° C., HDT was 74.0° C., tensile strength at yield point was 57 MPa, tensile strength at break point was 48 MPa, and Haze was 0.85%.

Comparative Example 4: Preparation of Polyester Resin 2190 g of dimethylterephthalate (11.3 mol), 1500 g of ethylene glycol (24.2 mol), and 60 g of isosorbide (0.41 mol) were injected, and 0.8 g of manganese (II) acetate tetrahydrate and 0.98 g of antimony (III) oxide as catalysts, and 0.6 g of cobalt (III) acetate tetrahydrate as an orthochromatic agent were injected, and then a temperature of a reactor was raised to 150° C. for 60 minutes while nitrogen was allowed to flow into the reactor. Then, nitrogen purging was stopped, and a reaction by-product, methanol was collected while the temperature of the reactor was raised to 250° C. for 2 hrs. The reaction was allowed to proceed until methanol generation was completed by a drop of the temperature of the reactor column.

Thereafter, 80 ppm (based on P element) of phosphoric acid as a stabilizer was injected, and then a pressure of the reactor was decreased from atmospheric pressure to 5 Torr (5 mmHg) for 30 minutes while the temperature of the reactor was raised from room temperature to 285° C. for 2 hrs. Then, the temperature and pressure of the reactor were maintained at 285° C. and 2 Torr (2 mmHg) to carry out a polycondensation reaction. The polycondensation reaction was carried out, until intrinsic viscosity (IV) of the mixture (melt) in the reactor became 0.50 dl/g.

The polyester resin obtained by the polycondensation reaction was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 213° C. at a rate of 40° C./hrs and maintained. The solid phase polymerization reaction was carried out for 15 hrs, until intrinsic viscosity (IV) of the particles in the reactor became 0.70 dl/g.

The amount of the moieties derived from terephthalic acid was 100 mol % with respect to the total moieties derived from acid in the polyester resin thus prepared, and the amount of the moieties derived from isosorbide was 0.2 mol %, the amount of the moieties derived from ethylene glycol was 98.8 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 50.5 J/g, Tg ($2^{nd}$ scan) was 80.1° C., HDT was 70.6° C., tensile strength at yield point was 55 MPa, tensile strength at break point was 17 MPa, and Haze was 0.95%.

Comparative Example 5: Preparation of Polyester Resin 3297 g of terephthalic acid (19.85 mol), 1269 g of ethylene glycol (20.4 mol), and 435 g of isosorbide (2.98 mol) were injected, and 0.86 g of $GeO_2$ and 0.72 g of $Sb_2O_3$ as catalysts, 2.35 g of phosphoric acid as a stabilizer, and 0.34 g of cobalt acetate as an orthochromatic agent were used.

A temperature of a reactor was raised to 220° C. for 90 minutes under nitrogen atmosphere of 2 kgf/cm², and maintained at 220° C. for 2 hrs, and then raised to 260° C. for 2 hrs. Next, esterification reaction was carried out while maintaining the temperature of the reactor at 260° C., until the mixture became transparent when the mixture in the reactor was observed with the naked eyes.

Subsequently, a product resulting from the esterification reaction was subjected to polycondensation at 260° C. under vacuum of less than 2 torr for 150 minutes to obtain a polyester resin having intrinsic viscosity (IV) of 0.50 dl/g.

The polyester resin was prepared as particles, and the particles were left at 140° C. for 1 hr for crystallization. The crystals were injected to a solid phase polymerization reactor of 20 L volume. Thereafter, nitrogen was allowed to flow into the reactor at a rate of 50 L/min. In this regard, the temperature of the reactor was raised from room temperature to 140° C. at a rate of 40° C./hr, and maintained at 140° C. for 3 hrs, and then the temperature was raised to 200° C. at a rate of 40° C./hrs and maintained at 200° C. The solid phase polymerization reaction was carried out, until intrinsic viscosity (IV) of the particles in the reactor became 0.75 dl/g.

The amount of the moieties derived from terephthalic acid was 100 mol % with respect to the total moieties derived from acid in the polyester resin thus prepared, and the amount of the moieties derived from isosorbide was 9 mol %, the amount of the moieties derived from ethylene glycol was 90 mol %, and the amount of the moieties derived from diethylene glycol was 1 mol %, with respect to the total moieties derived from diol.

Physical properties of the polyester resin were measured by the above-described methods, and as a result, it was confirmed that enthalpy of fusion in DSC $1^{st}$ scan was 41.2 J/g, Tg ($2^{nd}$ scan) was 89.3° C., HDT was 79.8° C., tensile strength at yield point was 56 MPa, tensile strength at break point was 18 MPa, and Haze was 0.76%.

Comparative Example 6: Preparation of Polyester Resin 4000 g of dimethylterephthalate (20.6 mol), 1860 g of ethylene glycol (30.0 mol), and 595 g of isosorbide (4.07 mol) were injected, and 8 ppm (based on metal) of tetra-n-butoxy titanium and manganese (II) acetate tetrahydrate as catalysts, and 6 ppm of Polysyntheren Blue RBL from Clariant Corp. and 6 ppm of Sandplast Red G from Clariant Corp. as orthochromatic agents were injected and then a temperature of a reactor was raised to 150° C. for 60 minutes while nitrogen was allowed to flow into the reactor. Then, nitrogen purging was stopped, and a reaction by-product, methanol was collected while the temperature of the reactor was raised to 250° C. for 2 hrs. The reaction was allowed to proceed until methanol generation was completed by a drop of the temperature of the reactor column.

Thereafter, 8 ppm of phosphoric acid as a stabilizer was injected, and then a pressure of the reactor was decreased from atmospheric pressure to 5 Torr (5 mmHg) for 30 minutes while the temperature of the reactor was raised from room temperature to 285° C. for 2 hrs. Then, the temperature and pressure of the reactor were maintained at 285° C. and 2 Torr (2 mmHg) to carry out a polycondensation reaction. The polycondensation reaction was carried out, until intrinsic viscosity (IV) of the mixture (melt) in the reactor became 0.55 dl/g.

The polyester resin obtained by the polycondensation reaction was prepared as particles, and the particles were left at 140° C. for 1 hr for crystallization. The crystals were injected to a solid phase polymerization reactor of 20 L volume. Thereafter, nitrogen was allowed to flow into the reactor at a rate of 20 L/kg*h. In this regard, the temperature of the reactor was raised from room temperature to 140° C. at a rate of 40° C./hr, and maintained at 140° C. for 3 hrs, and then the temperature was raised to 205° C. at a rate of 40° C./hrs and maintained. The solid phase polymerization reaction was carried out for 15 hrs, until intrinsic viscosity (IV) of the particles in the reactor became 0.75 dl/g.

The amount of the moieties derived from terephthalic acid was 100 mol % with respect to the total moieties derived from acid in the polyester resin thus prepared, and the amount of the moieties derived from isosorbide was 11 mol %, the amount of the moieties derived from ethylene glycol was 87 mol %, and the amount of the moieties derived from diethylene glycol was 2 mol %, with respect to the total moieties derived from diol.

Physical properties of the polyester resin were measured by the above-described methods, and as a result, it was confirmed that enthalpy of fusion in DSC $1^{st}$ scan was 37.5 J/g, Tg ($2^{nd}$ scan) was 88.0° C., HDT was 80.5° C., tensile strength at yield point was 56 MPa, tensile strength at break point was 19 MPa, and Haze was 0.69%.

Experimental Example: Evaluation of Polyester Resins

Physical properties of the polyester resins prepared in Examples 1 to 8 and Comparative Examples 1 to 6 are summarized in the following Table 1.

TABLE 1

| | Intrinsic viscosity of resin before solid phase reaction [dl/g] | Intrinsic viscosity of resin after solid phase reaction [dl/g] | Tg [° C.] | ΔHf [J/g] | HDT [° C.] | Tensile strength (@yield point) [MPa] | Tensile strength (@break point) [Mpa] | Haze [%] |
|---|---|---|---|---|---|---|---|---|
| Example 1 | 0.50 | 0.91 | 89.5 | 58.5 | 82.1 | 65 | 54 | 0.66 |
| Example 2 | 0.50 | 0.96 | 89.0 | 59.0 | 82.3 | 63 | 53 | 0.63 |
| Example 3 | 0.52 | 0.98 | 90.5 | 57.7 | 81.7 | 63 | 53 | 0.65 |
| Example 4 | 0.48 | 0.97 | 89.9 | 57.1 | 82.0 | 64 | 53 | 0.69 |
| Example 5 | 0.50 | 0.96 | 87.3 | 58.7 | 81.0 | 63 | 52 | 0.77 |
| Example 6 | 0.51 | 0.95 | 92.1 | 50.4 | 84.3 | 64 | 54 | 0.54 |
| Example 7 | 0.51 | 0.96 | 89.0 | 55.4 | 82.1 | 62 | 53 | 0.69 |

TABLE 1-continued

| | Intrinsic viscosity of resin before solid phase reaction [dl/g] | Intrinsic viscosity of resin after solid phase reaction [dl/g] | Tg [° C.] | ΔHf [J/g] | HDT [° C.] | Tensile strength (@yield point) [MPa] | Tensile strength (@break point) [Mpa] | Haze [%] |
|---|---|---|---|---|---|---|---|---|
| Example 8 | 0.51 | 0.85 | 89.5 | 41 | 82.3 | 63 | 52 | 0.52 |
| Comparative Example 1 | 0.65 | 0.91 | 89.1 | 38.0 | 81.6 | 57 | 47 | 0.64 |
| Comparative Example 2 | 0.50 | 0.70 | 89.7 | 39.6 | 81.8 | 56 | 18 | 0.63 |
| Comparative Example 3 | 0.60 | 0.97 | 84.5 | 53.5 | 74.0 | 57 | 48 | 0.85 |
| Comparative Example 4 | 0.50 | 0.70 | 80.1 | 50.5 | 70.6 | 55 | 17 | 0.95 |
| Comparative Example 5 | 0.50 | 0.75 | 89.3 | 41.2 | 79.8 | 56 | 18 | 0.76 |
| Comparative Example 6 | 0.55 | 0.75 | 88.0 | 37.5 | 80.5 | 56 | 19 | 0.69 |

Referring to Example 1 and Comparative Example 1, although the monomer mixtures having the same composition were polymerized under the same reaction conditions, ΔHf value was found to vary according to a difference in intrinsic viscosities of the polymers before solid phase polymerization. Further, referring to Example 1 and Comparative Example 2, although the intrinsic viscosities of the obtained polymers before solid phase polymerization are the same as each other, ΔHf value was found to vary according to intrinsic viscosity after solid phase polymerization. That is, ΔHf value may be increased by carrying out the solid phase polymerization until low intrinsic viscosity of the pellet reached high intrinsic viscosity. These results confirmed that the degree of crystallinity of the resin prepared according to Example 1 was higher than that of the resin of Comparative Example 1, and HDT, tensile strength at yield point, and tensile strength at break point were increased by controlling intrinsic viscosities before and after solid phase polymerization within particular ranges.

In Comparative Examples 3 and 4, a ratio of diol moieties derived from isosorbide with respect to the total diol moieties of the polyester resin was low, and therefore, regularity of polymer chains was high. Accordingly, the resins prepared according to Comparative Examples 3 and 4 showed high ΔHf value, that is, high degree of crystallinity, but showed low glass transition temperature due to the low ratio of diol moieties derived from isosorbide in the polymer chains. Consequently, it was confirmed that the resins of Comparative Examples 3 and 4 showed very low HDT than those of Examples 1 to 8, indicating slight improvement of heat resistance. Considering that HDT of at least 75° C. or higher is substantially required for hot fill jars, etc., the resins of Comparative Examples 3 and 4 are not suitable for use in hot fill jars, etc.

Further, the polyester resins prepared according to Comparative Examples 4, 5 and 6 showed low final intrinsic viscosity after solid phase polymerization, indicating very poor mechanical strength which may be confirmed by tensile strength at break point.

Accordingly, it was confirmed that in order to obtain high heat resistance and mechanical properties, the ratio of diol moieties derived from isosorbide in the polymer chains must be sufficiently high and thus the polyester resin must have a glass transition temperature of a particular level or higher, and in order to improve the degree of crystallinity while maintaining superior heat resistance and mechanical properties, solid phase polymerization must be carried out until low intrinsic viscosity of the pellet reaches high intrinsic viscosity.

For reference, the results of measuring hazes of all Examples showed that the hazes were less than 1%. Accordingly, it was confirmed that the polyester resin according to an embodiment of the present invention maintains high transparency while having improved mechanical strength and heat resistance (HDT), and there is no problem in the use of the polyester resin in bottles, etc.

What is claimed is:

1. A polyester resin having a structure, wherein acid moieties derived from a dicarboxylic acid or a derivative thereof and diol moieties derived from a diol are repeated by polymerization of the dicarboxylic acid or the derivative thereof comprising a terephthalic acid or a derivative thereof and the diol comprising isosorbide and ethylene glycol,
   the polyester resin comprising 7 to 20 mol % of diol moieties derived from isosorbide and 30 mol % or more of diol moieties derived from ethylene glycol with respect to the total diol moieties derived from the diol,
   the polyester resin having an intrinsic viscosity of 0.85 dl/g or more, which is measured at 35° C. after dissolving the polyester resin in ortho-chlorophenol at a concentration of 1.2 g/dl at 150° C. for 15 minutes, a glass transition temperature of 87° C. or higher, and an enthalpy of fusion of 40 J/g or more, which is measured during $1^{st}$ scan by differential scanning calorimetry (DSC).

2. The polyester resin of claim 1, wherein the enthalpy of fusion is 50 J/g or more, which is measured during $1^{st}$ scan by differential scanning calorimetry (DSC).

3. The polyester resin of claim 1, wherein the dicarboxylic acid or the derivative thereof comprises 0 mol % to 50 mol % of one or more selected from the group consisting of a C8 to C14 aromatic dicarboxylic acid or a derivative thereof and a C4 to C12 aliphatic dicarboxylic acid or a derivative thereof as an other dicarboxylic acid or a derivative thereof than the terephthalic acid or the derivative thereof, with respect to the total dicarboxylic acid or derivative thereof.

4. The polyester resin of claim 1, wherein the amount of the diol moieties derived from isosorbide is 7 mol % to 11 mol % with respect to the total diol moieties derived from the diol.

5. The polyester resin of claim 1, wherein the amount of the moieties derived from diethylene glycol is 6 mol % or less with respect to the total diol moieties derived from the diol.

6. The polyester resin of claim 1, wherein a haze of a specimen having a thickness of 6 mm obtained from the polyester resin is less than 1%, as measured in accordance with ASTM D1003-97.

7. The polyester resin of claim 1, wherein a heat deflection temperature (HDT) is 75° C. or higher.

8. The polyester resin of claim 1, wherein a number average molecular weight is 15,000 g/mol to 50,000 g/mol.

9. The polyester resin of claim 1, wherein the polyester resin is used in bottles, hot fill jars, high-pressure containers, sheets, stretched films, or fibers.

10. A method of preparing the polyester resin of claim 1, the method comprising:
  (a) carrying out an esterification reaction or an ester exchange reaction of (i) the dicarboxylic acid or a derivative thereof comprising a terephthalic acid or a derivative thereof and (ii) the diol comprising 7 mol % or more of isosorbide and 30 mol % or more of ethylene glycol with respect to the total diol;
  (b) carrying out a polycondensation reaction of a product resulting from the esterification reaction or the ester exchange reaction until an intrinsic viscosity as measured at 35° C. after dissolving the product in ortho-chlorophenol at a concentration of 1.2 g/dl at 150° C. for 15 minutes reaches 0.40 dl/g to 0.60 dl/g;
  (c) crystallizing a polymer prepared by the polycondensation reaction; and
  (d) carrying out solid phase polymerization of the crystallized polymer until an intrinsic viscosity as measured at 35° C. after dissolving the polymer in ortho-chlorophenol at a concentration of 1.2 g/dl at 150° C. for 15 minutes reaches 0.85 dl/g or more.

11. The method of preparing the polyester resin of claim 10, wherein part of the (ii) diol is injected during the esterification reaction or the ester exchange reaction.

12. The method of preparing the polyester resin of claim 10, wherein a polycondensation catalyst, a stabilizer, an orthochromatic agent, a crystallizing agent, an antioxidant, or a branching agent is added to a slurry before the starting of the (a) esterification reaction or the ester exchange reaction, or to a product after the completion of the esterification reaction or the ester exchange reaction.

13. The method of preparing the polyester resin of claim 10, wherein the crystallized polymer is subjected to solid phase polymerization for 30 hrs or longer in the (d) solid phase polymerization.

14. A resin molded article formed from the polyester resin of claim 1.

* * * * *